(12) United States Patent
Bonikowski et al.

(10) Patent No.: US 6,972,860 B1
(45) Date of Patent: Dec. 6, 2005

(54) ENCODING OF REQUESTS FOR SAMPLE COPY OUTPUT IN DOCUMENT ASSEMBLY TREES

(75) Inventors: Gregg A. Bonikowski, Rochester, NY (US); Patrick T. Igoe, Grand Island, NY (US); Michael P. Kirby, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,337

(22) Filed: Nov. 24, 1999

(51) Int. Cl.$^7$ .......................... G06F 3/12; G06K 15/02; H04N 1/23
(52) U.S. Cl. ...................... 358/1.15; 715/515; 715/526
(58) Field of Search ...................... 358/1.9, 296, 1.15, 358/1.16, 1.13, 1.14, 1.18, 401, 444, 468; 715/515, 526, 530

(56) References Cited

U.S. PATENT DOCUMENTS

| | | | |
|---|---|---|---|
| 3,936,180 A * | 2/1976 | Willard et al. ................. 399/10 |
| 4,480,545 A | 11/1984 | Fujisawa et al. ............ 101/183 |
| 5,164,842 A * | 11/1992 | Gauronski et al. .......... 358/401 |
| 5,289,768 A | 3/1994 | Keller ......................... 101/137 |
| 5,327,526 A * | 7/1994 | Nomura et al. ............. 358/1.16 |
| 5,488,223 A * | 1/1996 | Austin et al. ................ 235/375 |
| 5,535,009 A * | 7/1996 | Hansen ........................ 358/296 |
| 5,553,216 A | 9/1996 | Yoshioka et al. ............ 395/145 |
| 5,555,803 A | 9/1996 | Holm ........................... 101/180 |
| 5,559,606 A | 9/1996 | Webster et al. .............. 358/296 |
| 5,579,447 A * | 11/1996 | Salgado ....................... 358/1.9 |
| 5,604,600 A | 2/1997 | Webster ....................... 358/296 |
| 5,606,395 A | 2/1997 | Yang ............................. 399/81 |
| 5,617,215 A | 4/1997 | Webster et al. .............. 358/296 |
| 5,619,307 A * | 4/1997 | Machino et al. ............. 399/11 |
| 5,631,740 A | 5/1997 | Webster et al. .............. 358/296 |
| 5,638,752 A | 6/1997 | Hartung et al. ............... 101/77 |
| 5,646,740 A | 7/1997 | Webster et al. .............. 358/296 |
| 5,682,247 A | 10/1997 | Webster et al. .............. 358/296 |
| 5,701,557 A | 12/1997 | Webster et al. ............... 399/77 |
| 5,710,635 A | 1/1998 | Webster et al. .............. 358/296 |
| 5,729,790 A * | 3/1998 | Conley et al. ................. 399/77 |
| 5,812,273 A * | 9/1998 | Conley et al. .............. 358/296 |
| 5,825,988 A | 10/1998 | Collard et al. .............. 395/112 |
| 6,175,700 B1 * | 1/2001 | Miller et al. .................. 399/72 |
| 6,480,293 B1 * | 11/2002 | Bonikowski et al. ...... 358/1.15 |
| 6,616,702 B1 * | 9/2003 | Tonkin ....................... 715/515 |
| 6,874,121 B1 * | 3/2005 | Mayer ........................ 715/513 |
| 2002/0051169 A1 * | 5/2002 | Nishikawa .................. 358/1.15 |
| 2002/0171868 A1 * | 11/2002 | Yoshimura et al. ........ 358/1.15 |
| 2002/0196452 A1 * | 12/2002 | Komiya ...................... 358/1.13 |
| 2003/0058466 A1 * | 3/2003 | Couwenberg et al. ..... 358/1.13 |
| 2003/0072031 A1 * | 4/2003 | Kuwata et al. ............ 358/1.15 |
| 2003/0184806 A1 * | 10/2003 | Nara et al. ................. 358/1.18 |

FOREIGN PATENT DOCUMENTS

| | | | |
|---|---|---|---|
| EP | 0 465 166 A2 | 8/1992 | ............ H04N 1/32 |
| EP | 0 686 915 A2 | 12/1995 | ............. G06F 9/46 |
| EP | 0769 869 A2 | 4/1997 | ............ H04N 1/60 |
| EP | 0 778 515 A1 | 6/1997 | ............. G06F 3/12 |

\* cited by examiner

*Primary Examiner*—Scott A. Rogers
(74) *Attorney, Agent, or Firm*—Fay, Sharpe, Fagan, Minnich & McKee, LLP

(57) ABSTRACT

The concept of a document assembly tree is extended to include in nodes, such as a node describing a sheet 330 or a node describing a compilation 342, a sample interval specification. The sample interval specification is interpreted as a request to produce sample copies of the part of a job described by the node every time the sample interval specified in the node has transpired.

Digital printing system modules are arranged and configured to provide a sample job destination 39 separate from the main job destination.

8 Claims, 3 Drawing Sheets

ENCODING OF REQUESTS FOR SAMPLE COPY OUTPUT IN DOCUMENT ASSEMBLY TREES

FIELD OF THE PRESENT INVENTION

The invention relates to the art of digital printing. It finds specific application as part of a digital production printing system.

BACKGROUND OF THE PRESENT INVENTION

Digital printing systems can be as simple as an office laser printer or can be room size devices that include multiple paper feeders, multiple mark facilities (for example a black and white unit and a color unit), collators, staplers and shrink wrappers.

During the printing of long jobs, especially those with color critical output, it is often desirable to view sample copies. Viewing samples allows the press operator to ensure that the appropriate content is being printed and that the appearance of the output matches the customers expectations. When offset presses are used, examining a sample is fairly straightforward. Copies of just one page are being produced at any one time and there are access points in the printing press that allow sheets to be viewed, and in some cases retrieved, during the printing process.

An offset printing press might, for example, have five print units. Each print unit applies one color in a multi-color printing operation. The press is usually open and the quality of the print job can be monitored by looking at the output of each print unit as it is conveyed from one print unit to the next. Adjustments to the print units can be made as the job runs.

In digital production printing, multi-page documents are being produced and delivered via closed paper paths to finishing devices that do not allow convenient access to printed output until the printing process is complete. As a result, it is extremely difficult to monitor product quality during a digital production printing job. If a problem develops in the middle of a job it is not noticed until after the job is complete. In large jobs, this can be very costly, both in wasted time and material.

Some attempts have been made to give digital printing systems more of an on-the-fly adjustability that is common in offset presses. U.S. Pat. No. 5,606,395 to Yang et al. and assigned to Xerox Corporation, is for a method and apparatus that allow an operator to monitor a digital printing system's output tray and enter fine-tuning commands through an electronic control. The operator can determine the effectiveness of his commands by watching how they affect the sheets that arrive at the output tray.

This technique is most effective when copies of only one page are being printed. When collated copies of multi-page documents are being produced and the sheet or sheets of interest are hidden underneath the top sheet, this technique loses its usefulness. In order to check the adjustments, the operator has to remove a completed compilation from the output tray, unwrap it (if it is shrink wrapped), and sort through the sheets to find the sheet or sheets of interest. If further corrections are needed then all the copies created in the meantime have to be discarded or reworked. In either case, time and material are wasted.

An improvement is needed in digital production printing machines and processes that allows print quality to be monitored in real-time. The present invention includes such an improvement.

Prior art systems often comprise, a tight coupling between the platform controlling the user interface (the digital front end) and that performing print engine control. Indeed in many cases these functions are handled by the same computing platform.

In some newer, more open and modular printing architectures, however, the digital front end, or user interface, is not as intimately involved in the actual printing process and is not directly aware of print job progress. Instead, based on a document description it receives from the digital front end, another computing platform, typically a mark facility controller, performs the scheduling and control of the print job. In these systems the digital front end submits a document assembly tree to the mark facility controller. The mark facility controller then manages the job through completion, determining the optimal use of feeding, marking, and finishing resources. A document assembly tree is a digitally coded outline describing a document's production properties. The mark facility controller receives a document assembly tree and scans it to determine which sheets, for example, call for high resolution printing, which sheets require the services of a color mark facility, which sheets can be printed in low resolution, etc. The mark facility controller determines the source (fax, scanner, computer file etc. . . ) of the content of each sheet and determines the optimum use of resources, so that the job is completed as efficiently as possible. The digital front end places an order for a job. The mark facility controller orchestrates its production as directed by the document assembly tree.

The present invention relates to a method to extend the document assembly tree mechanism to allow for the specification and production of samples of critical, or representative parts, of a job. These samples can be used by an operator to monitor quality. If a problem develops in the middle of a run, such as, poor registration, streaking, color drift or incomplete stapling, the operator will see it reflected in the samples and can pause the job, take corrective action, and resume the job. Alternatively, a sensor can examine the samples and provide information to the machine to allow it to make automatic corrections to the process.

SUMMARY OF THE PRESENT INVENTION

One aspect of the present invention is a method for using an extended document assembly tree to generate samples of portions of a main job during the production of the main job. The method comprises the steps of generating a document assembly tree having nodes that describe portions of a main job; including in the node descriptions, keywords that specify a sample delivery interval, and producing the main job and sample jobs as indicated by the document assembly tree.

Another aspect of the present invention is a document processing apparatus comprising a plurality of machine modules that together process and/or produce printed media. The apparatus includes at least one destination designated for the delivery of main job production and at least one destination designated, at least temporarily, for the delivery of interrupting job production.

One advantage of the present invention over the prior art is that it allows job quality to be monitored at a minimal cost.

Another advantage of the present invention is that it allows corrective action to be taken before large amounts of time and material are wasted due to poor print quality.

Still another advantage of the present invention is that it produces sample jobs with a minimum amount of communication between a job specifying entity and a job producing entity.

Still other advantages of the present invention will become apparent to those of ordinary skill in the art upon reading and understanding the following detailed description of the preferred embodiment.

BRIEF DESCRIPTION OF THE DRAWING

The invention may take form in various components and arrangements of components, and in various steps and arrangements of steps. The drawings are only for purposes of illustrating the preferred embodiments and are not to be construed as limiting the invention.

DETAILED DESCRIPTION OF THE PRESENT INVENTION

Figure 1:
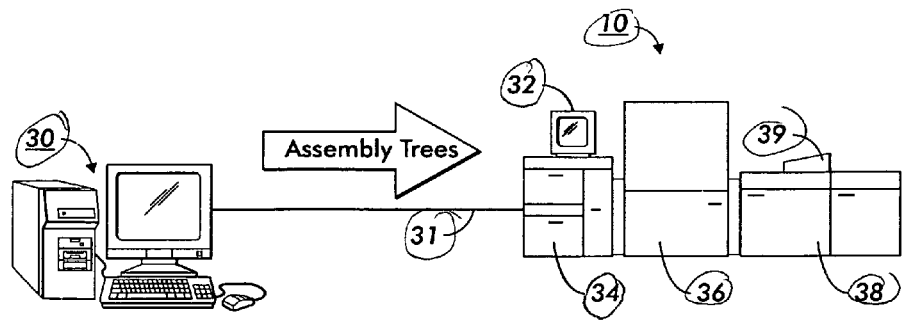
FIG. 1 shows a first digital production printing system comprising a first arrangement of modules in accordance with the present invention.

Referring to FIG. 1, a typical digital printing system 10 may include a digital front end 30, a communications bus 31, a mark facility controller 32, a feeder device 34, a print engine 36, and a finishing device 38. The digital front end 30 is principally an operator interface, however, it may serve other functions as well, for example; it may store configuration information for jobs that are performed on a regular basis. It may also serve as an interface to other devices such as scanners, fax machines and computer networks. The mark facility controller 32 is depicted in FIG. 1 as a separate terminal but it may be built into one or more of the other modules, usually a print engine 36, and not be visible to the user. It receives job configuration information from the digital front end via the communications bus 31 and then orchestrates the fulfillment of the job by scheduling and controlling other modules. The feeder device 34 usually stores a variety of paper stock, including various size sheets, letterhead, and special purpose media such as velum. It delivers the appropriate material to the next module, typically a print engine 36, at the direction of the mark facility controller 32. The print engine then prints the appropriate image onto the media, as directed by the mark facility controller 32. Image data arrives at the print engine 36 via an image path (not shown) as directed by the mark facility controller 32. The mark facility controller 32 also directs the finishing device 38. It can be a collator, stapler, shrink wrapper or other device or machines capable of any combination of those or other functions. In cases where the present invention is used, the finishing device may have a special location, such as sample/purge tray 39 set aside from a main job delivery area, for the delivery of samples.

Figure 2:
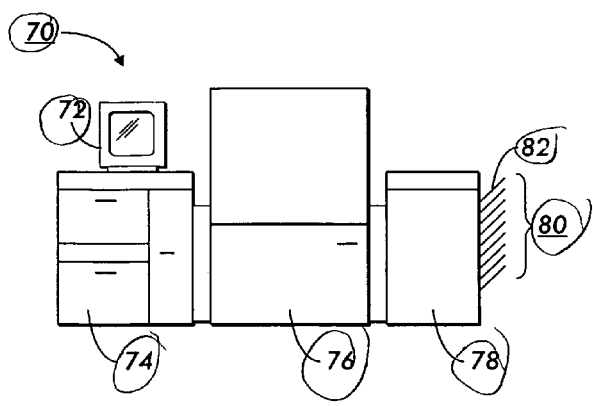
FIG. 2 shows a second digital production printing system comprising a second arrangement of modules in accordance with the present invention.

Referring to FIG. 2, second digital printing system 70 includes a digital front end 72, a feeding device 74, a print engine 76 and a collator 78. The collator 78 assembles each document copy in one of a set of document trays 80. Configuration information designates one of the document trays 80 to be a sample or interrupting job output tray 82.

Digital printing systems 10 and 70 are just two examples of module configurations that can be used to practice the present invention and are not meant to limit the invention. Other configurations are possible. In some cases there may only be one computing platform visible. The computing platform might be a digital front end or it might carry out both the functions of a digital front end and a mark facility controller. In some cases the mark facility controller may be hidden from view. The mark facility controller might be installed in one of the modules, such as a print engine, that comprise the system. The digital front end function might be handled over a network. Therefore it is possible to build a system to practice the present invention that has no visible computing platform. Furthermore, systems can comprise multiple print engines and/or multiple feeding devices and/ or multiple finishing devices. It is even possible to practice the present invention with a system that does not include a print engine. One example of such a system is a signature booklet maker, which is familiar to those of ordinary skill in the art.

Figure 3:
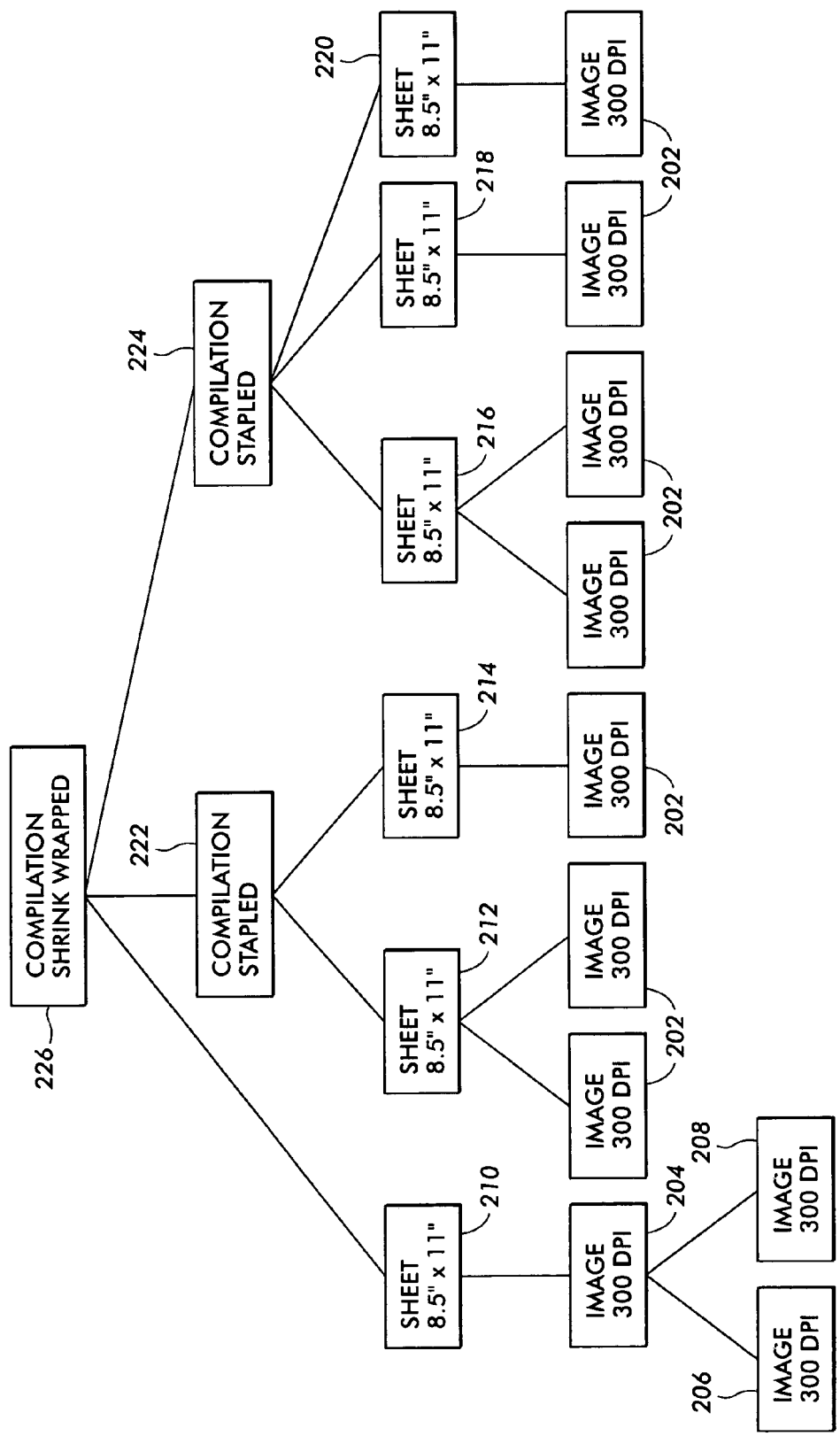
FIG. 3 is a diagram of a prior art document assembly tree showing some of the information contained in each of the nodes.

FIG. 3, illustrates an example of a prior art assembly tree structure that defines a typical document. A document is generally a set of copy sheets made up of multiple images. For example, various images as illustrated at 202 are combined to provide sheets 212, 214, 216, 218, and 220. It should be understood that any of the images 202 can be the product of several sub-images, For example, image 204 is shown as being a combination of sub-images 206 and 208. As will also be understood, a sheet can be any combination of images and sub-images. For example, sheets 212 and 216 are illustrated, each as a combination of two images. It should be understood that a sheet is generally comprised of a plurality of images and sub-images.

A compilation is a combination of multiple sheets. For example, compilation node 222 is a combination of sheet nodes 212 and 214 and compilation node 224 is a combination of sheet nodes 216, 218, and 220. As shown, the compilation nodes 222 and 224 are for the purpose of stapling sheets. A compilation can also be a combination of sheets and other compilations. For example, compilation node 226, for a shrink-wrap operation, is a compilation of sheet node 210, compilation node 222 and compilation node 224. As illustrated, the assembly tree nodes comprise images, sheets, and compilations.

Compilations may have any number of groupings or off-spring. Sheets may have front and/or back images. Images may have sub-images, recursively. All nodes may have properties such as size or weight. All nodes may have finishing specifications such as staple or trim. All properties and finishing identifiers are expressed through universally registered keywords.

Each node contains summary information about the part of the print job that it represents. For example, the top compilation node 226 specifies that the compilation is to be shrink-wrapped. Sheet node 210 specifies a paper size of 8½×11 inches. Image node 204 specifies a resolution of 300 dots per inch and that it is made up of two other images represented by image node 206 and image node 208. As mentioned above, the nodes contain other specifications as well. They are not shown for purposes of brevity.

A mark facility controller interprets these specifications. For example, a paper size specification is interpreted and results in a command to a feeder device to provide that size media. A resolution specification may result in a print engine selection, where there are more than one print engine available, or a print mode selection where the print engine may be driven in a fast, low resolution mode or a slow or high-resolution mode.

The present invention extends the functionality of the document assembly tree by adding a new kind of registered keyword to the lexicon of possible keywords. The keyword that is added is a sample interval specification. If it is set to zero in a given node then no sample is ever made when that particular node is processed. If some other number is specified, for example "10", then the mark facility controller 32 generates a sample of the material represented by the node, every tenth time it processes the node. The operator may then inspect the sample to make sure the system is operating as expected. Alternatively a sensor can inspect the sample and provide feedback to the system to allow it to make automatic adjustments.

Figure 4:
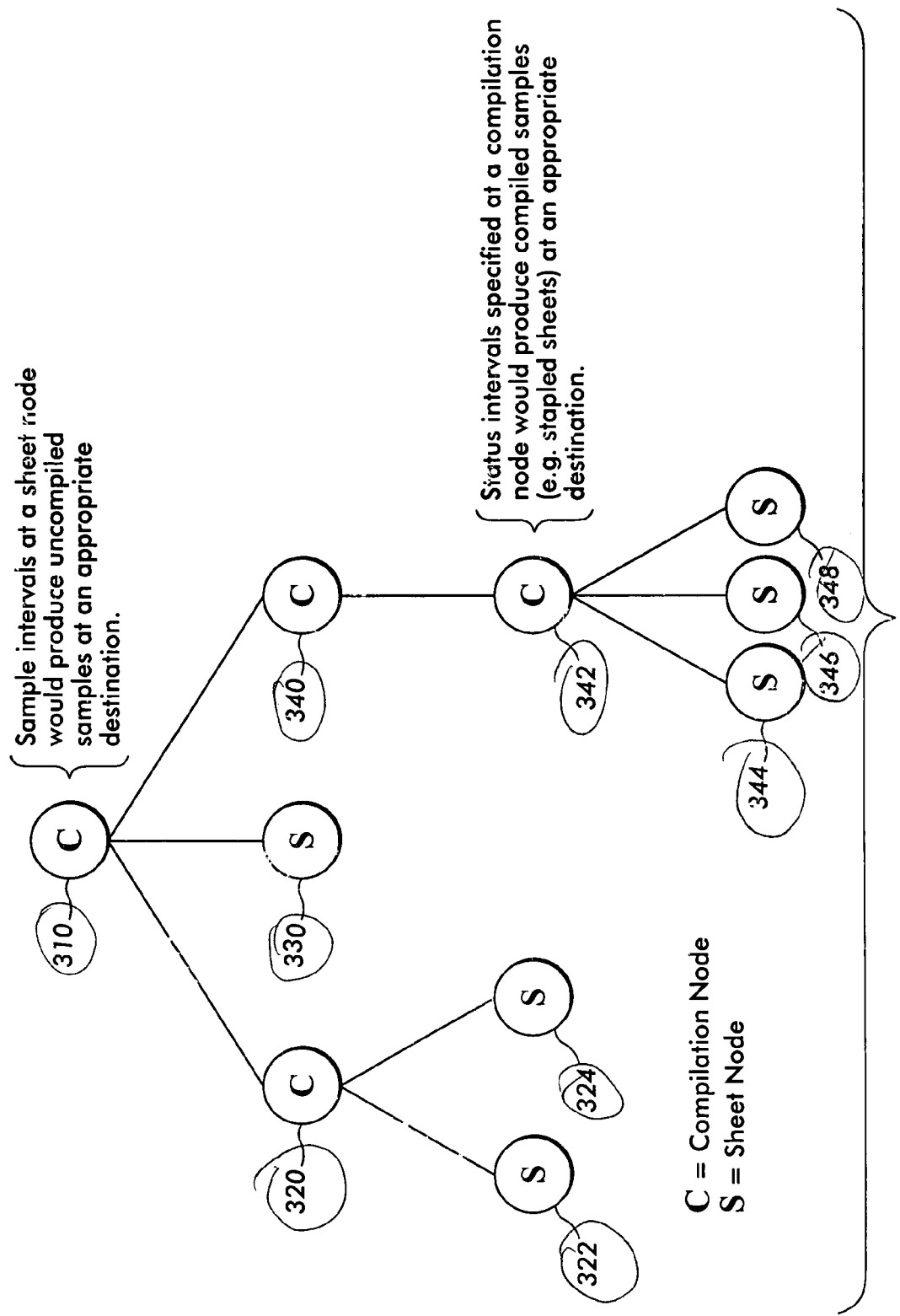
FIG. 4 is a less detailed depiction of a document assembly tree with aspects of the present invention highlighted.

FIG. 4 is a simplified depiction of a document assembly tree that illustrates how the sample interval specification of the present invention might be used. Top compilation node 310 calls for the inclusion of a first compilation node 320 which itself is comprised of first sheet node 322 and second sheet node 324. Top compilation node 310 also includes a third sheet node 330 and a second sub-compilation node 340. Sub-compilation node 340 calls for the inclusion of a fourth sub-compilation node 342 which in turn calls for the inclusion of fourth, fifth and sixth sheet nodes 344, 346, and 348.

The Figure shows how setting a sample interval specification in the third sheet node 330 will generate samples of that sheet at an appropriate destination. It also shows that setting a sample interval specification in the third sub-compilation node 342 generates samples of the sub-compilation specified (e.g. stapled sheets) by that node.

The invention has been described with reference to the preferred embodiment. Obviously, modifications and alterations will occur to others upon reading and understanding the preceding detailed description. It is intended that the invention be construed as including all such modifications and alterations insofar as they come with the scope of the appended claims or equivalents thereof.

What is claimed is:

1. In a document processing apparatus comprising a plurality of machine modules for processing and/or producing printed media, including a designated sample destination, a method to generate samples of portions of a main job during the production of the main job, the method comprising:

generating a document assembly tree having nodes that describe portions of a main job;

including in the node descriptions, keywords that specify a sample delivery interval; and producing the main job and sample jobs as indicated by the document assembly tree.

2. The method of claim 1 wherein generating a document assembly tree and including keywords are performed at least in part, by a first computing platform and producing the main job is performed at least in part, by a second computing platform, and producing the main job further comprises:

the first computing platform submitting the document assembly tree to the second computing platform.

3. The method of claim 1 wherein producing the main job further comprises:

checking each node for a sample delivery interval specification;

when processing a node that contains a sample delivery interval specification, comparing that sample delivery interval specification with a current interval; and, if the sample delivery interval specification has been reached, producing a sample of the part of the main job specification described by the node at the sample delivery destination.

4. The method of claim 3 wherein the sample delivery interval is measured in a number of copies produced.

5. The method of claim 3 wherein the sample delivery interval is measured in time.

6. A document processing apparatus comprising a plurality of machine modules that together process and/or produce printed media, the apparatus comprising:

a document assembly tree generator operative to generate a document assembly tree having at least one node that describes a portion of a main job and a keyword that specifies a sample delivery interval for sample jobs;

at least one destination designated for delivery of main job production; and, at least one destination designated for delivery of sample job production.

7. The apparatus of claim 6 wherein the destination designated for the delivery of sample job production is a sample/purge tray.

8. The apparatus of claim 6 further comprising:

at least one finishing device for the delivery of main job production; and, at least one finishing device for the delivery of sample job production.

\* \* \* \* \*